(12) United States Patent
Zhou et al.

(10) Patent No.: US 11,831,384 B2
(45) Date of Patent: Nov. 28, 2023

(54) JOINT PANEL PARAMETER UPDATE

(71) Applicant: QUALCOMM Incorporated, San Diego, CA (US)

(72) Inventors: Yan Zhou, San Diego, CA (US); Qian Zhang, Basking Ridge, NJ (US); Ruhua He, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/450,229

(22) Filed: Oct. 7, 2021

(65) Prior Publication Data

US 2022/0131592 A1   Apr. 28, 2022

Related U.S. Application Data

(60) Provisional application No. 63/198,511, filed on Oct. 23, 2020.

(51) Int. Cl.
| | |
|---|---|
| *H04B 7/06* | (2006.01) |
| *H04B 7/08* | (2006.01) |
| *H04L 5/00* | (2006.01) |
| *H04W 72/0453* | (2023.01) |
| *H04W 72/044* | (2023.01) |

(52) U.S. Cl.
CPC ........... *H04B 7/0695* (2013.01); *H04B 7/088* (2013.01); *H04L 5/0023* (2013.01); *H04W 72/046* (2013.01); *H04W 72/0453* (2013.01)

(58) Field of Classification Search
CPC .... H04B 7/0695; H04B 7/088; H04B 7/0404; H04L 5/0023; H04L 5/001; H04W 72/0453; H04W 72/046
See application file for complete search history.

(56) References Cited

U.S. PATENT DOCUMENTS

| | | | | |
|---|---|---|---|---|
| 11,316,579 | B2* | 4/2022 | Guan | H04W 72/0453 |
| 2018/0139036 | A1* | 5/2018 | Islam | H04L 7/041 |
| 2020/0323026 | A1* | 10/2020 | Kim | H04W 72/23 |
| 2021/0105780 | A1* | 4/2021 | Jin | H04L 5/0044 |
| 2021/0144716 | A1* | 5/2021 | Choi | H04W 76/27 |
| 2022/0022215 | A1* | 1/2022 | Gao | H04B 7/0404 |
| 2022/0045810 | A1* | 2/2022 | Yang | H04L 5/0098 |
| 2022/0217746 | A1* | 7/2022 | Kang | H04B 7/0404 |
| 2023/0037090 | A1* | 2/2023 | Wang | H04W 52/58 |

* cited by examiner

*Primary Examiner* — Kenneth T Lam
(74) *Attorney, Agent, or Firm* — QUALCOMM Incorporated

(57) ABSTRACT

Various aspects of the present disclosure generally relate to wireless communication. In some aspects, a user equipment (UE) may transmit information identifying a panel or beam configuration associated with a set of carriers. The UE may communicate with a base station in accordance with the panel or beam configuration associated with the set of carriers. Numerous other aspects are described.

30 Claims, 9 Drawing Sheets

JOINT PANEL PARAMETER UPDATE

CROSS-REFERENCE TO RELATED APPLICATION

This patent application claims priority to U.S. Provisional Patent Application No. 63/198,511, filed on Oct. 23, 2020, entitled "JOINT PANEL PARAMETER UPDATE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for joint panel parameter update.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting information identifying a panel or beam configuration associated with a set of carriers; and communicating with a base station in accordance with the panel or beam configuration associated with the set of carriers.

In some aspects, a method of wireless communication performed by a base station includes receiving information identifying a panel or beam configuration associated with a set of carriers; and communicating with a UE in accordance with the panel or beam configuration associated with the set of carriers.

In some aspects, a UE for wireless communication includes a memory; and one or more processors coupled to the memory, the memory and the one or more processors configured to: transmit information identifying a panel or beam configuration associated with a set of carriers; and communicate with a base station in accordance with the panel or beam configuration associated with the set of carriers.

In some aspects, a base station for wireless communication includes a memory; and one or more processors coupled to the memory, the memory and the one or more processors configured to: receive information identifying a panel or beam configuration associated with a set of carriers; and communicate with a UE in accordance with the panel or beam configuration associated with the set of carriers.

In some aspects, a non-transitory computer-readable medium storing a set of instructions for wireless communication includes one or more instructions that, when executed by one or more processors of a UE, cause the UE to: transmit information identifying a panel or beam configuration associated with a set of carriers; and communicate with a base station in accordance with the panel or beam configuration associated with the set of carriers.

In some aspects, a non-transitory computer-readable medium storing a set of instructions for wireless communication includes one or more instructions that, when executed by one or more processors of a base station, cause the base station to: receive information identifying a panel or beam configuration associated with a set of carriers; and communicate with a UE in accordance with the panel or beam configuration associated with the set of carriers.

In some aspects, an apparatus for wireless communication includes means for transmitting information identifying a panel or beam configuration associated with a set of carriers; and means for communicating with a base station in accordance with the panel or beam configuration associated with the set of carriers.

In some aspects, an apparatus for wireless communication includes means for receiving information identifying a panel or beam configuration associated with a set of carriers; and means for communicating with a UE in accordance with the panel or beam configuration associated with the set of carriers.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
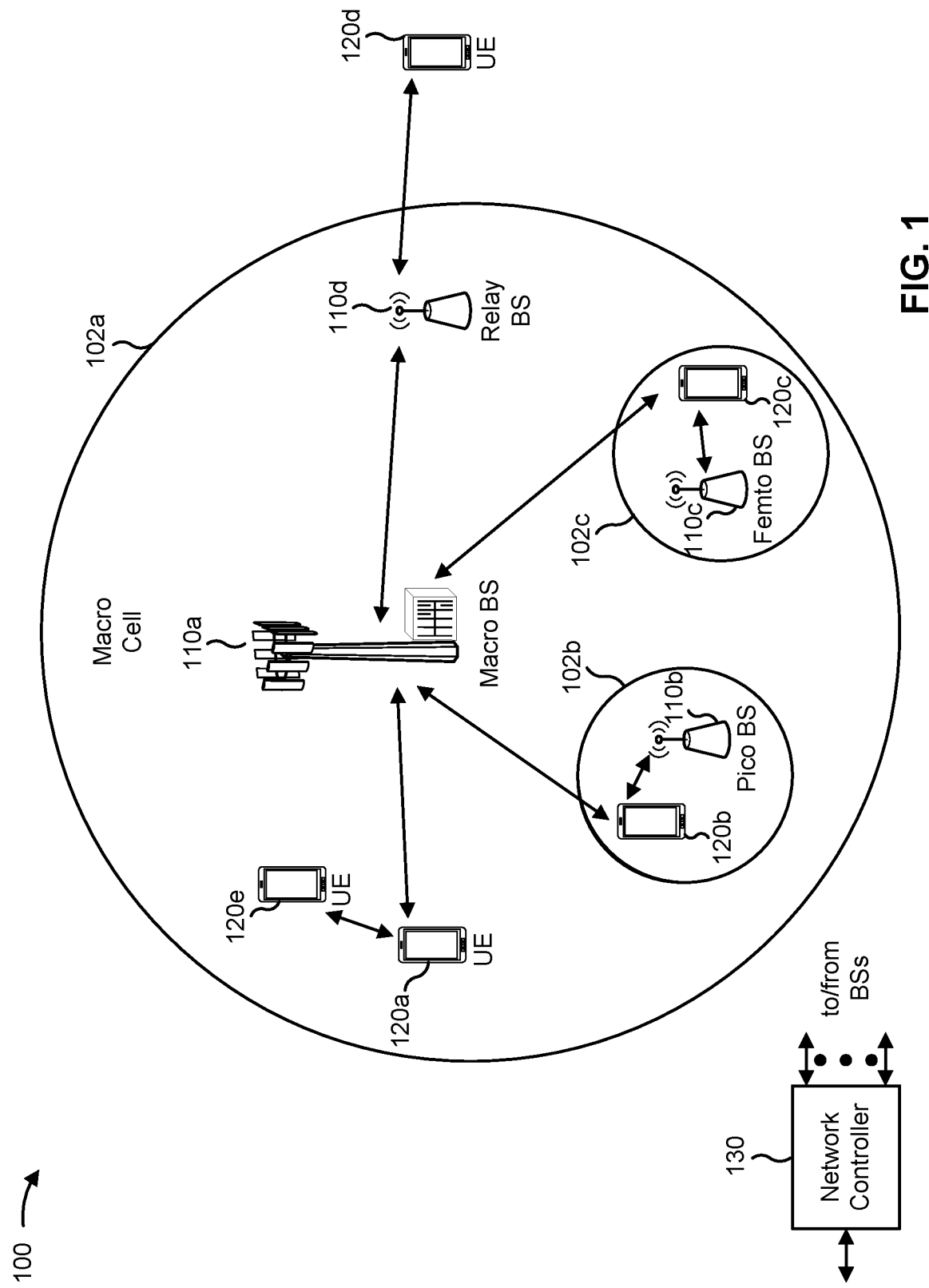
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
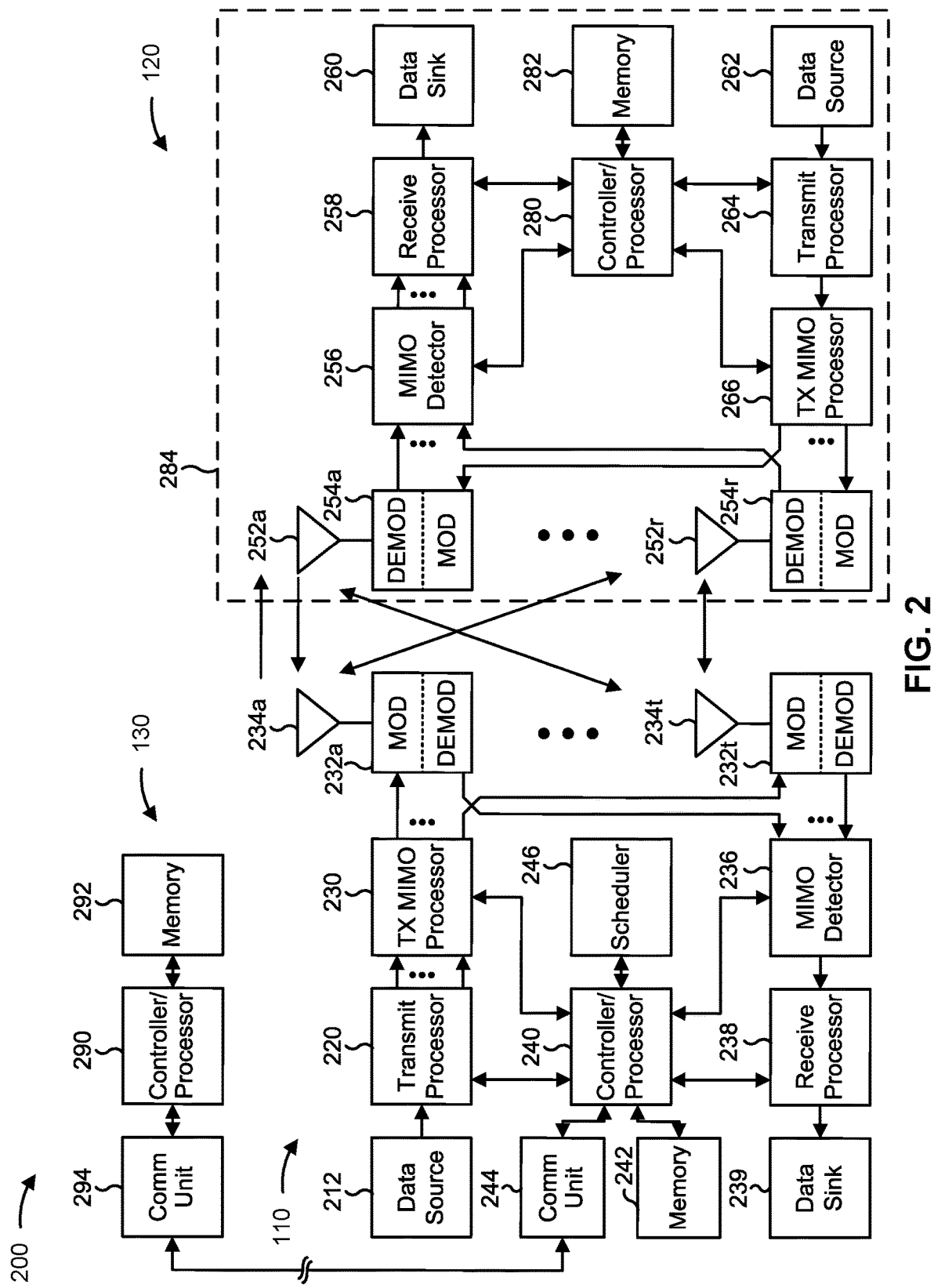
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with joint panel parameter update, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, UE 120 may include means for transmitting information identifying a panel or beam configuration associated with a set of carriers, means for communicating with a base station in accordance with the panel or beam configuration associated with the set of carriers, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving information identifying a panel or beam configuration associated with a set of carriers, means for communicating with a UE in accordance with the panel or beam configuration associated with the set of carriers, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
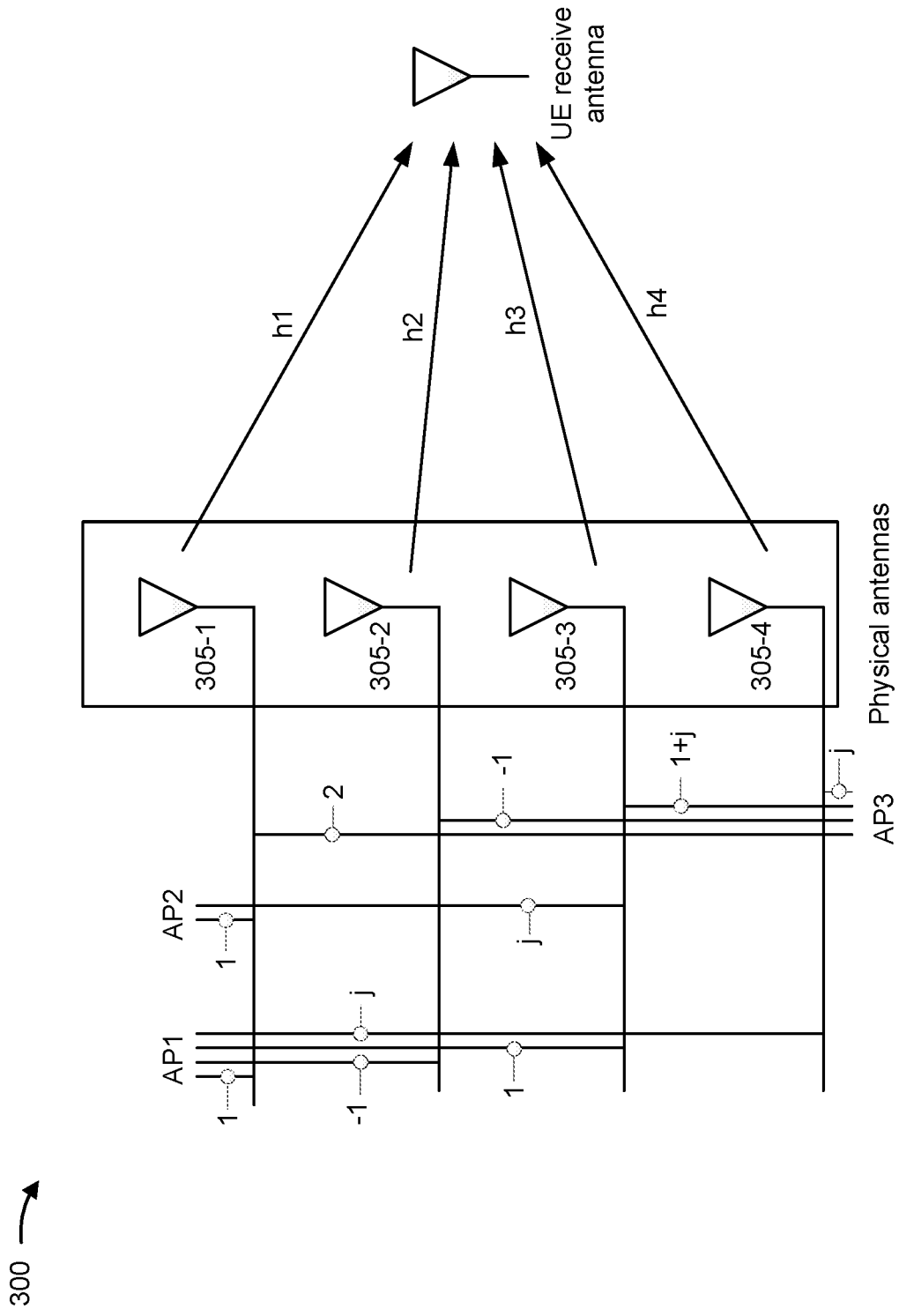
FIG. 3 is a diagram illustrating an example of antenna ports, in accordance with the present disclosure.

FIG. 3 is a diagram illustrating an example 300 of antenna ports, in accordance with the present disclosure.

As shown in FIG. 3, a first physical antenna 305-1 may transmit information via a first channel h1, a second physical antenna 305-2 may transmit information via a second channel h2, a third physical antenna 305-3 may transmit information via a third channel h3, and a fourth physical antenna 305-4 may transmit information via a fourth channel h4. Such information may be conveyed via a logical antenna port, which may represent some combination of the physical antennas and/or channels. In some cases, a UE 120 may not have knowledge of the channels associated with the physical antennas and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 300, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and "precoder" may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+ j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

As indicated above, FIG. 3 is provided merely as an example. Other examples may differ from what is described with regard to FIG. 3.

Figure 4:
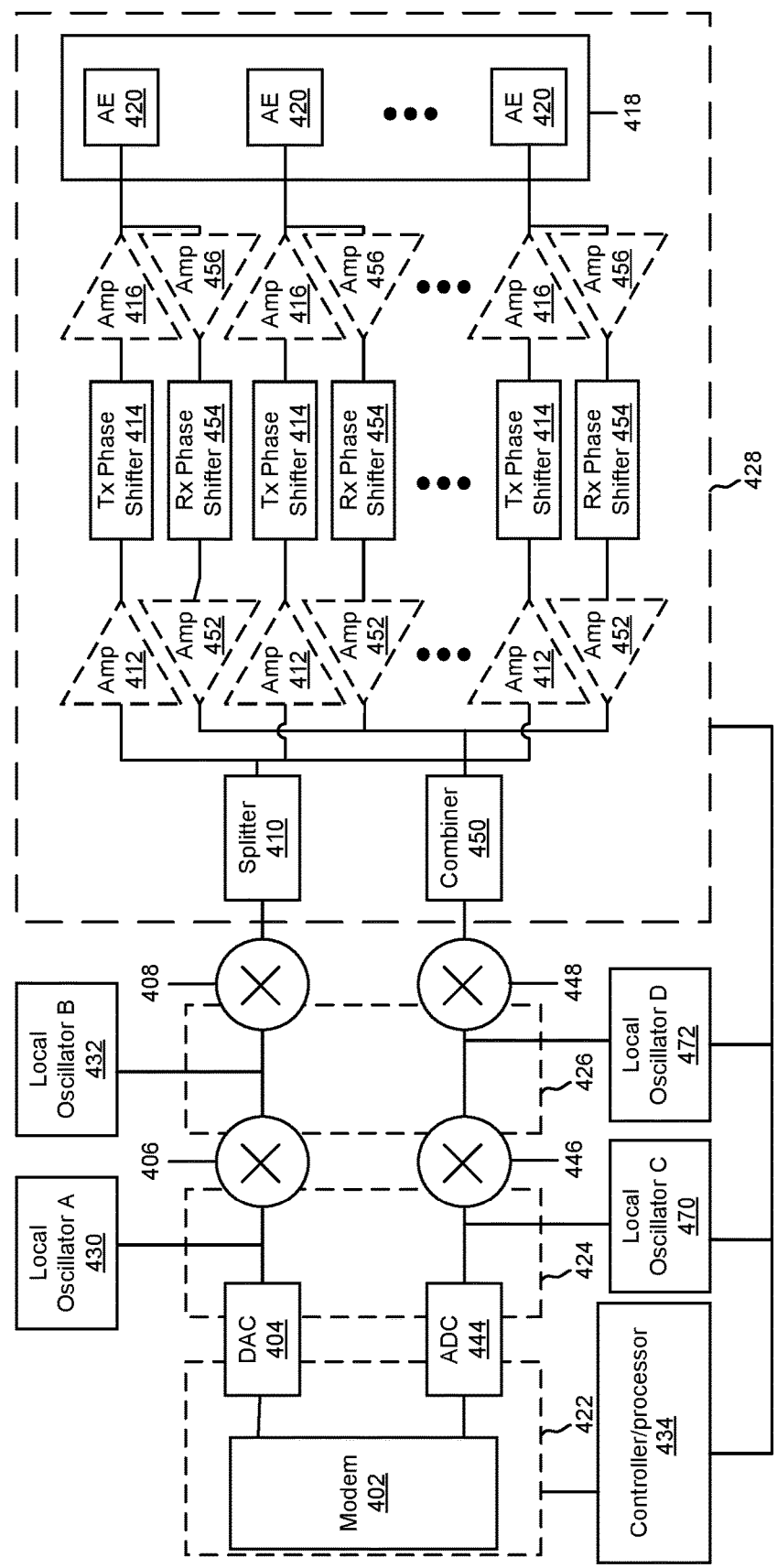
FIG. 4 is a diagram illustrating an example of a beamforming architecture, in accordance with the present disclosure.

FIG. 4 is a diagram illustrating an example beamforming architecture 400 that supports beamforming for millimeter wave (mmW) communications, in accordance with the present disclosure. In some aspects, architecture 400 may implement aspects of wireless network 100. In some aspects, architecture 400 may be implemented in a transmitting device (e.g., a first wireless communication device, UE, or base station) and/or a receiving device (e.g., a second wireless communication device, UE, or base station), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420.

Transmission lines or other waveguides, wires, traces, and/or the like are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog radio frequency (RF) signals travel or are processed. The architecture also includes a local oscillator A 430, a local oscillator B 432, and a controller/processor 434. In some aspects, controller/processor 434 corresponds to controller/processor 240 of the base station described above in connection with FIG. 2 and/or controller/processor 280 of the UE described above in connection with FIG. 2.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two-dimensional pattern, or another pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to analog signals. The analog signals output from ADC 444 is input to modem 402 for baseband processing, such as decoding, de-interleaving, and/or the like.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary quantity of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The controller/processor 434 may be located partially or fully within one or more other components of the architecture 400. For example, the controller/processor 434 may be located within the modem 402 in some aspects.

As indicated above, FIG. 4 is provided as an example. Other examples may differ from what is described with regard to FIG. 4.

As described above, a UE may have a plurality of transmit chains for a plurality of panels. A panel may include an antenna array and at least one of a transmit or receive chain for independent processing (e.g., independent of each other panel of the UE) of data for transmission and/or reception relative to other panels of the plurality of panels. For example, a panel may include a transmit chain, a receive chain, or a transmit chain and a receive chain and may include a set of antenna elements of an antenna array. Each panel can be identified by corresponding panel identifier or another type of identifier (e.g., a beam group identifier or an antenna port group identifier). Each panel, of the plurality of panels, may be associated with a respective set of communication-related parameters. Communication-related parameters may include a panel-specific timing advance (TA) value, a power control parameter, an activation status (e.g., whether a panel is activated or deactivated), or a Fast Fourier Transform (FFT) time window parameter, among other examples. A base station and a UE may communicate to configure each communication-related parameter on a per carrier (e.g., per component carrier) basis. For example, to set or update a group of communication-related parameters for a panel, a base station may transmit a plurality of messages to set or update the group of communication-related parameters for a corresponding plurality of carriers. However, the corresponding plurality of carriers may be transmitted or received using the same physical panel. As a result, communication-related parameter update may cause excessive overhead and/or latency and may interrupt other communications.

Some aspects described herein enable joint panel parameter update. For example, a UE may transmit a report, to a BS, indicating whether a UE panel has the same or independent panel-related operation parameters across a set of carriers. In this case, when the UE panel has the same panel-related operation parameters, the BS may transmit a single message to update the panel-related operation parameters across the set of carriers. In this way, the UE and the BS may enable reduced control information overhead, reduced latency, or reduced communication interruptions, among other examples.

Figure 5:
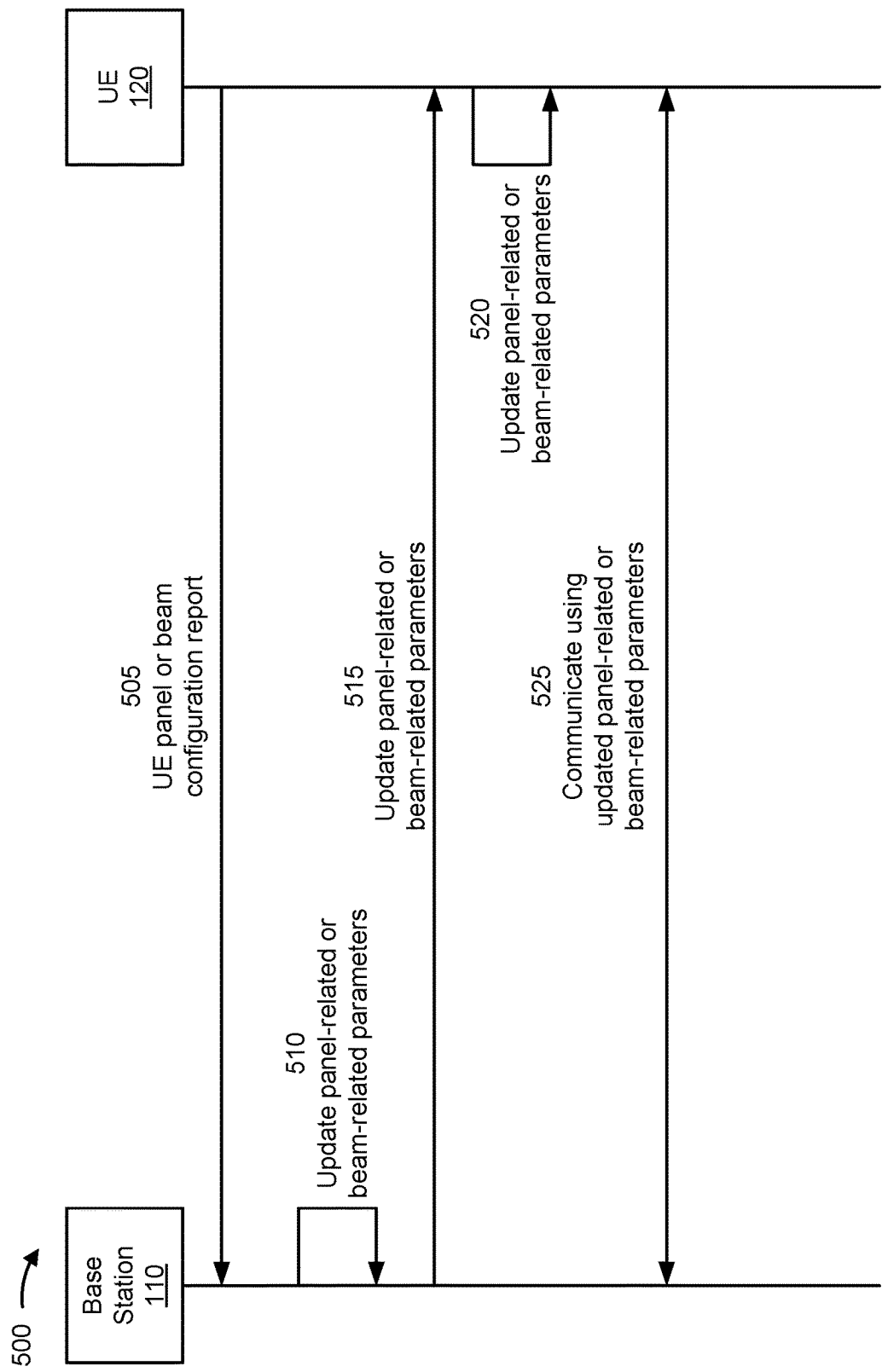
FIG. 5 is a diagram illustrating an example associated with joint panel parameter update, in accordance with the present disclosure.

FIG. 5 is a diagram illustrating an example 500 associated with joint panel parameter update, in accordance with the present disclosure. As shown in FIG. 5, a base station 110 and a UE 120 may communicate with one another.

As shown by reference number 505, UE 120 may provide a UE panel or beam configuration report. For example, UE 120 may provide a UE capability message including configuration information indicating whether a UE panel has the same or independent panel-related operation parameters across a set of carriers.

"Carrier," sometimes referred to as a "component carrier", may refer to a logical channel for data transfer. For example, a carrier may be a set of frequency blocks assigned for a single user (e.g., a single UE). A plurality of carriers (e.g., contiguous or non-contiguous carriers) may be combined in a carrier aggregation mode into a single channel for a single UE to enhance data capacity for the single UE. Carriers may be in the same or different frequency bands. In some cases, a first carrier may be a primary carrier and a second carrier may be a secondary carrier. The primary carrier may carry control information for scheduling data communications on the secondary carrier (e.g., in a cross-carrier scheduling mode). Alternatively, a carrier may carry control information for self-scheduling of data communications on the carrier (e.g., in a carrier self-scheduling mode).

In some aspects, UE 120 may report that a particular panel-related operation parameter is common across a set of carriers. For example, UE 120 may indicate whether there is commonality across the set of carriers for a panel activation status, an uplink timing advance value, an uplink power control parameter (e.g., a P0 value, an alpha value, a closed-loop index, or a pathloss reference signal parameter), or a downlink FFT window (e.g., a start time, a duration, or an end time), among other examples. In some aspects, UE 120 may signal commonality for a group of panels. For example, UE 120 may transmit an indication that a group of panels has a common value for a panel-related operation parameter across a set of carriers. Additionally, or alternatively, UE 120 may transmit an indication that the group of panels have independent values for the panel-related operation parameter across the set of carriers.

In some aspects, UE 120 may report whether a set of carriers share a common panel. For example, UE 120 may include, in a UE capability message, information indicating that a plurality of carriers are covered, for transmission or reception, by a single panel. In this case, UE 120 may identify the plurality of carriers by identifying a band (e.g., that includes the plurality of carriers), a band combination, or a set of carrier indices identifying the plurality of carriers (e.g., a carrier index list), among other examples. Additionally, or alternatively, UE 120 may identify a panel for which a parameter is to be updated across the plurality of carriers based at least in part on a UE-assigned panel identifier, a BS-assigned panel identifier, or a panel configuration (e.g., an identification of an antenna port number for a panel), among other examples.

Further, UE 120 may identify the single panel using a single common panel identifier space. In this case, the single panel may be configured for downlink-only operation, uplink-only operation, or both uplink and downlink operation. Additionally, or alternatively, UE 120 may include a first panel identifier space for identifying a first panel (e.g., with downlink-only operation) and a second panel identifier space for identifying a second panel (e.g., with uplink-only operation). In some aspects, UE 120 may report that a set of carriers share a group of common panels. For example, UE 120 may identify a band, with a plurality of carriers, and indicate that the band is mapped to a group of panels.

As shown by reference numbers 510-520, base station 110 and UE 120 may communicate to update panel-related or beam-related parameters. For example, base station 110 may transmit an indication of an update to a set of panel-related parameters and base station 110 and/or UE 120 may implement the update to the set of panel-related parameters to enable subsequent communication. In some aspects, base station 110 may transmit the indication of the update based at least in part on receiving a UE report. For example, base station 110 may receive a UE report that a set of carriers share the same panel, and base station 110 may determine to concurrently update panel-related parameters across the set of carriers. In this case, base station 110 may, for example, restrict the concurrent update to a subset of panel-related parameters that UE 120 has identified as having a common value across the set of carriers.

In some aspects, base station 110 may transmit a message identifying a particular panel for which a set of panel-related parameters are to be updated across carriers common to the particular panel. For example, base station 110 may include a BS-assigned panel identifier (e.g., which may map to a UE-assigned panel identifier according to a configured mapping), a UE-assigned panel identifier, and/or the like. In this case, base station 110 may transmit the single message with the identifier of the panel to update at least one parameter (e.g., at least one of the aforementioned panel-related parameters) across a plurality of carriers on the panel and UE 120 may implement the update. Additionally, or alternatively, base station 110 may transmit the single message to update a plurality carriers across a plurality of panels (e.g., identified by a set of corresponding applied panel identifiers, a panel group identifier, or a set of carrier identifiers). In some aspects, base station 110 transmit the single message using a downlink control information (DCI) message, a medium access control (MAC) control element (CE) message, or a radio resource control (RRC) message, among other examples. For example, base station 110 may transmit the single message to indicate a set of parameters that are to be updated, a panel identifier of a panel for which the set of panels are to be updated (e.g., a corresponding applied panel identifier or panel group identifier), or an indication of the set of carriers to which the update to the set of parameters is to be applied, among other examples.

In some aspects, base station 110 may identify a serving cell to identify one or more panels and one or more carriers to which an update of a parameter applies. For example, UE 120 may determine that a set of applied carriers are serving cells sharing an applied panel (e.g., which UE 120 may have reported to base station 110 in a UE capability). Additionally, or alternatively, UE 120 may receive a set of applied carrier indices or a corresponding carrier group index from which to determine which carriers across which panels to apply an update.

Additionally, or alternatively, UE 120 may receive configuration information with a set of carrier lists and may receive an update message that includes information identifying a carrier list of the set of carrier lists (e.g., the update message may include an index value) from which to identify carriers to which to apply an update. In this case, if the index value identifies a single carrier index that is included in a carrier list, UE 120 may apply an update to panel-related parameters for all carriers in the carrier list. In contrast, if the carrier index is not included in a carrier list, UE 120 may apply the update to panel-related parameters for a single carrier identified by the carrier index.

In some aspects, base station 110 may communicate with UE 120 to update a beam-related operation parameter across a set of carriers. For example, UE 120 may transmit a single message to update an aforementioned beam-related operation parameter across downlink or uplink beams for a set of carriers. In this case, UE 120 may indicate whether a beam-related parameter (e.g., a timing advance value) is the same or different across a plurality of carriers and/or across uplink and downlink beams. For example, base station 110 may update a timing advance with a first value across a plurality of carriers for a first uplink beam and with a second value across the plurality of carriers for a second uplink beam. In some aspects, base station 110 may indicate an update to a downlink beam using a downlink transmission configuration indicator (TCI) state or a joint downlink and uplink TCI state. Similarly, base station 110 may indicate an update to an uplink beam using an uplink TCI state or a joint downlink and uplink TCI state. Additionally, or alternatively, base station 110 may indicate an update to the uplink beam using a spatial relationship information (e.g., a quasi-co-location (QCL) configuring) message.

As shown by reference number 525, base station 110 and UE 120 may communicate using the updated panel-related or beam-related parameters. For example, UE 120 may communicate with base station 110 using a UE panel in accordance with a panel or beam configuration identified in the panel or beam configuration information. In this case, UE 120 may use one or more carriers on the UE panel to communicate with base station 110 and the one or more carriers may be configured in accordance with the panel or beam configuration.

As indicated above, FIG. 5 is provided as an example. Other examples may differ from what is described with respect to FIG. 5. For example, other examples may have additional messages communicated between base station 110 and UE 120, fewer messages communicated between base station 110 and UE 120, or differently arranged messages communicated between base station 110 and UE 120, among other examples.

Figure 6:
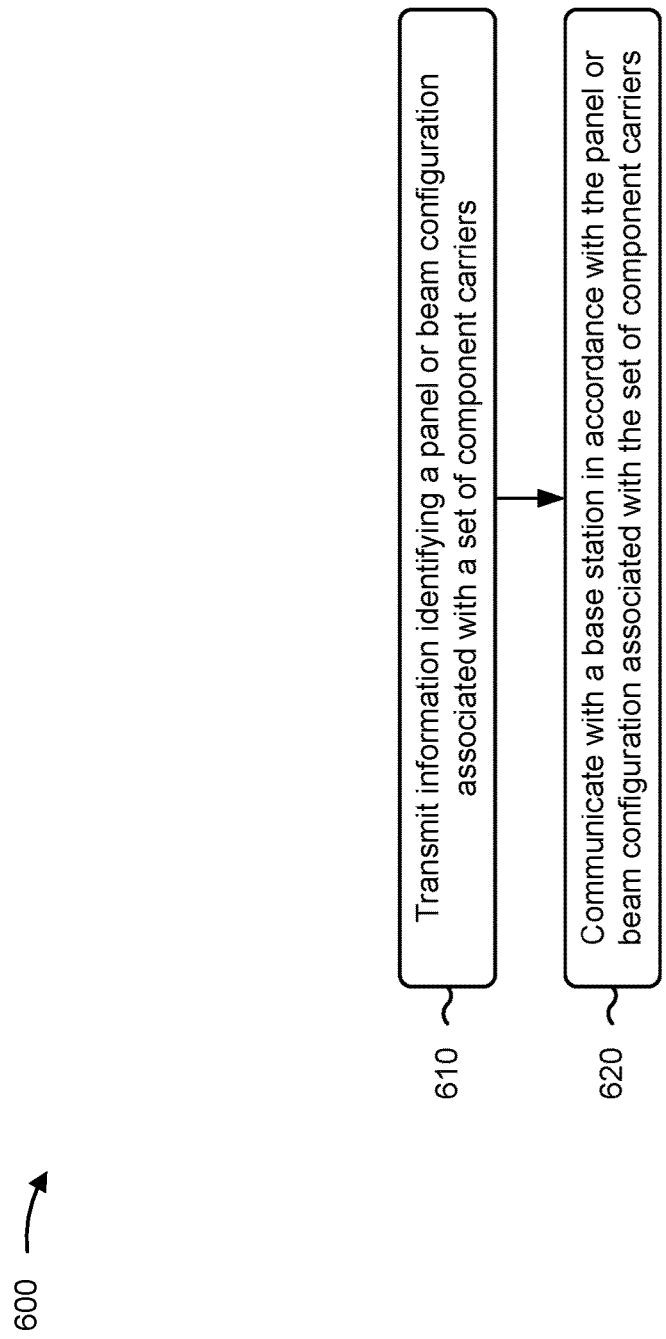
FIGS. 6-7 are diagrams illustrating example processes associated with joint panel parameter update, in accordance with the present disclosure.

FIG. 6 is a diagram illustrating an example process 600 performed, for example, by a UE, in accordance with the present disclosure. Example process 600 is an example where the UE (e.g., UE 120) performs operations associated with joint panel parameter update.

As shown in FIG. 6, in some aspects, process 600 may include transmitting information identifying a panel or beam configuration associated with a set of carriers (block 610). For example, the UE (e.g., using transmission component 804, depicted in FIG. 8) may transmit information identifying a panel or beam configuration associated with a set of carriers, as described above.

As further shown in FIG. 6, in some aspects, process 600 may include communicating with a base station in accordance with the panel or beam configuration associated with the set of carriers (block 620). For example, the UE (e.g., using reception component 802 or transmission component 804, depicted in FIG. 8) may communicate with a base station in accordance with the panel or beam configuration associated with the set of carriers, as described above.

Process 600 may include additional aspects, such as any single aspect or any combination of aspects described below and/or in connection with one or more other processes described elsewhere herein.

In a first aspect, transmitting the information identifying the panel or beam configuration comprises transmitting a UE capability message including the information identifying the panel or beam configuration.

In a second aspect, alone or in combination with the first aspect, the panel or beam configuration includes identification information identifying at least one panel or beam, and the identification information is at least one of a panel identifier, a beam identifier, a panel group identifier, a beam group identifier, an antenna port identifier, or an antenna port group identifier.

In a third aspect, alone or in combination with one or more of the first and second aspects, the panel or beam configuration includes a panel-related operation parameter, and the panel-related operation parameter includes at least one of a panel activation status, an uplink timing advance parameter, an uplink power control parameter, or a downlink fast Fourier transform window parameter.

In a fourth aspect, alone or in combination with one or more of the first through third aspects, the information identifying the panel or beam configuration includes information indicating one or more carriers, of the set of carriers, to which an identified panel-related operation parameter applies.

In a fifth aspect, alone or in combination with one or more of the first through fourth aspects, the information identifying the panel or beam configuration includes information indicating one or more panels to which an identified panel-related operation parameter applies.

In a sixth aspect, alone or in combination with one or more of the first through fifth aspects, the information identifying the panel or beam configuration includes information indicating one or more panels to which an identified panel-related operation parameter applies across one or more carriers of the set of carriers.

In a seventh aspect, alone or in combination with one or more of the first through sixth aspects, the information identifying the panel or beam configuration includes information indicating that a subset of the set of carriers shares a common panel.

In an eighth aspect, alone or in combination with the seventh aspect, the subset of the set of carriers is identified by a band, a band combination, or a set of carrier indices.

In a ninth aspect, alone or in combination with one or more of the seventh through eighth aspects, the common panel is identified by a panel identifier or panel configuration.

In a tenth aspect, alone or in combination with the ninth aspect, the panel identifier is associated with a single common identifier space and an associated panel is configured for downlink-only processing, uplink-only processing, or downlink and uplink processing.

In an eleventh aspect, alone or in combination with the ninth aspect, the panel identifier is associated with a first panel identifier space for a downlink-only processing panel and a second panel identifier space for an uplink-only processing panel.

In a twelfth aspect, alone or in combination with one or more of the first through eleventh aspects, the information identifying the panel or beam configuration includes information indicating that a subset of the set of carriers shares a plurality of panels.

In a thirteenth aspect, alone or in combination with one or more of the first through twelfth aspects, process 600 includes receiving a configuration message updating one or more panel-related operation parameters for a particular panel across a plurality of carriers of the set of carriers.

In a fourteenth aspect, alone or in combination with the thirteenth aspect, a panel-related operation parameter, of the one or more panel-related operation parameters, has a common value across the plurality of carriers.

In a fifteenth aspect, alone or in combination with one or more of the thirteenth through fourteenth aspects, the particular panel is identified by a base station assigned panel identifier that corresponds to a UE panel identifier of the particular panel.

In a sixteenth aspect, alone or in combination with one or more of the thirteenth through fifteenth aspects, the panel or beam configuration message is at least one of a downlink control information message, a medium access control control element message, or a radio resource control message.

In a seventeenth aspect, alone or in combination with one or more of the thirteenth through sixteenth aspects, the panel or beam configuration message includes particular information identifying a corresponding applied panel identifier or panel group identifier and identifying the plurality of carriers, and the particular information comprises information identifying a plurality of serving cells sharing the particular panel, information identifying carrier indices of the plurality of carriers, information identifying a carrier group index of the plurality of carriers, or information identifying a single carrier index.

In an eighteenth aspect, alone or in combination with one or more of the thirteenth through seventeenth aspects, process 600 includes updating the one or more panel-related operation parameters across the plurality of carriers identified in the panel or beam configuration message.

In a nineteenth aspect, alone or in combination with one or more of the first through eighteenth aspects, process 600 includes updating, based at least in part on transmitting the information identifying the panel or beam configuration, a plurality of beam-related operation parameters across a plurality of carriers of the set of carriers.

In a twentieth aspect, alone or in combination with the nineteenth aspect, updating the plurality of beam-related operation parameters comprises updating a first beam on a particular panel with a first value of one of plurality of beam-related operation parameters, and updating a second beam on the particular panel with a second value that is different from the first value of one of plurality of beam-related operation parameters.

In a twenty-first aspect, alone or in combination with one or more of the nineteenth through twentieth aspects, process 600 includes receiving a beam indication based at least in part on transmitting the information identifying the panel or beam configuration, and updating the plurality of beam-related operation parameters comprises updating the plurality of beam-related operation parameters based at least in part on the beam indication.

In a twenty-second aspect, alone or in combination with the twenty-first aspect, the beam indication is at least one of a downlink transmission configuration indicator (TCI) state, an uplink TCI state, a joint downlink and uplink TCI state, or a spatial relationship information message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
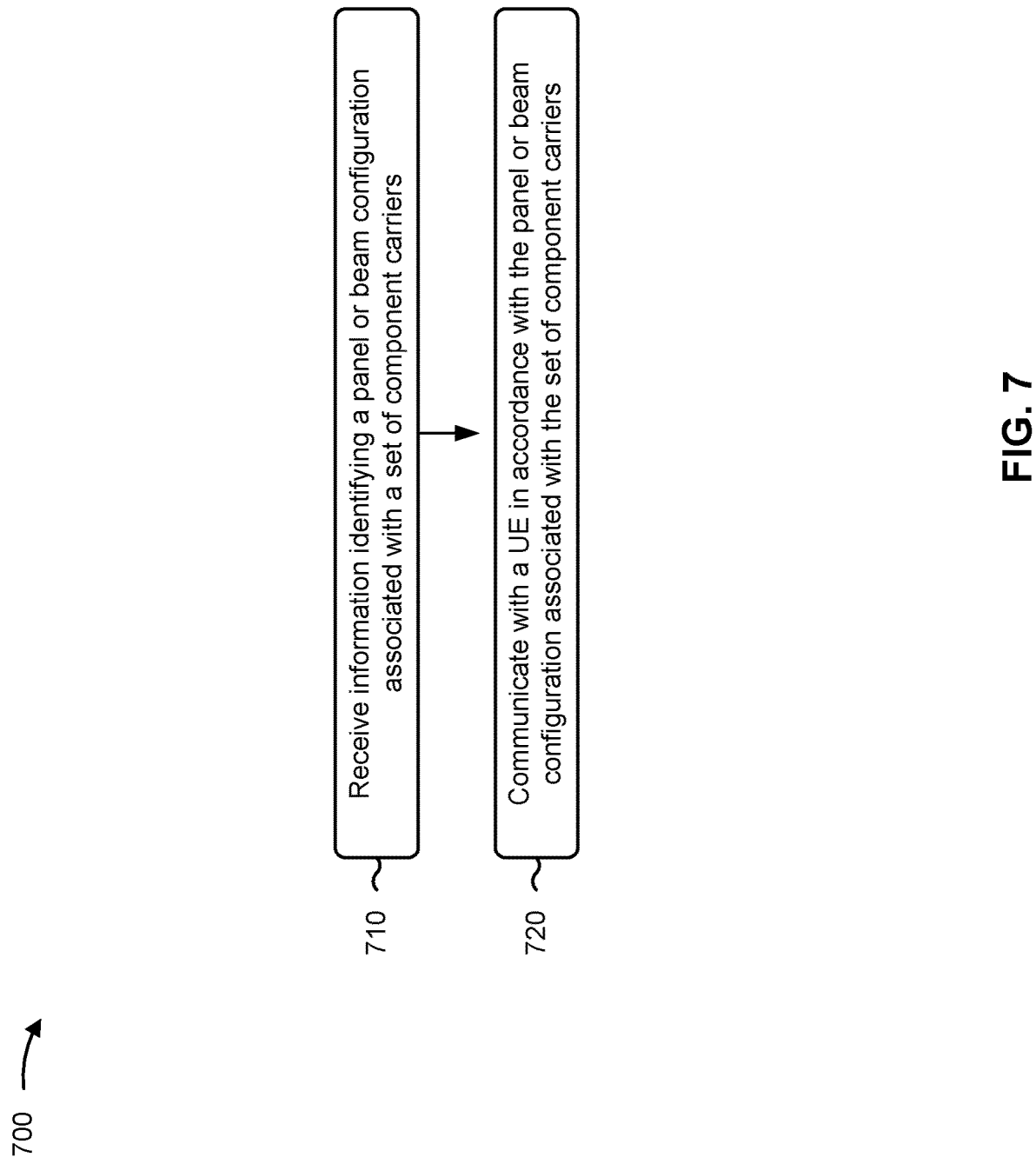

FIG. 7 is a diagram illustrating an example process 700 performed, for example, by a base station, in accordance with the present disclosure. Example process 700 is an example where the base station (e.g., base station 110) performs operations associated with joint panel parameter update.

As shown in FIG. 7, in some aspects, process 700 may include receiving information identifying a panel or beam configuration associated with a set of carriers (block 710). For example, the base station (e.g., using reception component 902, depicted in FIG. 9) may receive information identifying a panel or beam configuration associated with a set of carriers, as described above.

As further shown in FIG. 7, in some aspects, process 700 may include communicating with a UE in accordance with the panel or beam configuration associated with the set of carriers (block 720). For example, the base station (e.g., using reception component 902 or transmission component 904, depicted in FIG. 9) may communicate with a UE in accordance with the panel or beam configuration associated with the set of carriers, as described above.

Process 700 may include additional aspects, such as any single aspect or any combination of aspects described below and/or in connection with one or more other processes described elsewhere herein.

In a first aspect, receiving the information identifying the panel or beam configuration comprises receiving a UE capability message including the information identifying the panel or beam configuration.

In a second aspect, alone or in combination with the first aspect, the panel or beam configuration includes identification information identifying at least one panel or beam, and the identification information is at least one of a panel identifier, a beam identifier, a panel group identifier, a beam group identifier, an antenna port identifier, or an antenna port group identifier.

In a third aspect, alone or in combination with one or more of the first and second aspects, the panel or beam configuration includes a panel-related operation parameter, and the panel-related operation parameter includes at least one of a panel activation status, an uplink timing advance parameter, an uplink power control parameter, or a downlink fast Fourier transform window parameter.

In a fourth aspect, alone or in combination with one or more of the first through third aspects, the information identifying the panel or beam configuration includes information indicating one or more carriers, of the set of carriers, to which an identified panel-related operation parameter applies.

In a fifth aspect, alone or in combination with one or more of the first through fourth aspects, the information identifying the panel or beam configuration includes information indicating one or more panels to which an identified panel-related operation parameter applies.

In a sixth aspect, alone or in combination with one or more of the first through fifth aspects, the information identifying the panel or beam configuration includes information indicating one or more panels to which an identified panel-related operation parameter applies across one or more carriers of the set of carriers.

In a seventh aspect, alone or in combination with one or more of the first through sixth aspects, the information identifying the panel or beam configuration includes information indicating that a subset of the set of carriers shares a common panel.

In an eighth aspect, alone or in combination with the seventh aspect, the subset of the set of carriers is identified by a band, a band combination, or a set of carrier indices.

In a ninth aspect, alone or in combination with the seventh aspect, the common panel is identified by a panel identifier or panel configuration.

In a tenth aspect, alone or in combination with one or more of the eighth through ninth aspects, the panel identifier is associated with a single common identifier space and an associated panel is configured for downlink-only processing, uplink-only processing, or downlink and uplink processing.

In an eleventh aspect, alone or in combination with one or more of the first through tenth aspects, the panel identifier is associated with a first panel identifier space for a downlink-only processing panel and a second panel identifier space for an uplink-only processing panel.

In a twelfth aspect, alone or in combination with one or more of the first through eleventh aspects, the information identifying the panel or beam configuration includes information indicating that a subset of the set of carriers shares a plurality of panels.

In a thirteenth aspect, alone or in combination with one or more of the first through twelfth aspects, process 700 includes transmitting a configuration message to update one or more panel-related operation parameters for a particular panel across a plurality of carriers of the set of carriers.

In a fourteenth aspect, alone or in combination with the thirteenth aspect, a panel-related operation parameter, of the one or more panel-related operation parameters, has a common value across the plurality of carriers.

In a fifteenth aspect, alone or in combination with one or more of the thirteenth through fourteenth aspects, the particular panel is identified by a base station assigned panel identifier that corresponds to a UE panel identifier of the particular panel.

In a sixteenth aspect, alone or in combination with one or more of the first through fifteenth aspects, the panel or beam configuration message is at least one of a downlink control information message, a medium access control control element message, or a radio resource control message.

In a seventeenth aspect, alone or in combination with one or more of the thirteenth through sixteenth aspects, the panel or beam configuration message includes particular information identifying a corresponding applied panel identifier or panel group identifier and identifying the plurality of carriers, and the particular information comprises information identifying a plurality of serving cells sharing the particular panel, information identifying carrier indices of the plurality of carriers, information identifying a carrier group index of the plurality of carriers, or information identifying a single carrier index.

In an eighteenth aspect, alone or in combination with one or more of the thirteenth through seventeenth aspects, transmitting the configuration message comprises transmitting the configuration message to update the one or more panel-related operation parameters across the plurality of carriers identified in the panel or beam configuration message.

In a nineteenth aspect, alone or in combination with one or more of the thirteenth through eighteenth aspects, transmitting the configuration message comprises transmitting the configuration message to update a plurality of beam-related operation parameters across a plurality of carriers of the set of carriers.

In a twentieth aspect, alone or in combination with the nineteenth aspect, the configuration message includes information identifying a first update to a first beam on a particular panel with a first value of one of plurality of beam-related operation parameters and information identifying a second update to a second beam on the particular panel with a second value that is different from the first value of one of plurality of beam-related operation parameters.

In a twenty-first aspect, alone or in combination with one or more of the nineteenth through twentieth aspects, process 700 includes transmitting a beam indication based at least in part on transmitting the information identifying the panel or beam configuration to update the plurality of beam-related operation parameters.

In a twenty-second aspect, alone or in combination with the twenty-first aspect, the beam indication is at least one of a downlink transmission configuration indicator (TCI) state, an uplink TCI state, a joint downlink and uplink TCI state, or a spatial relationship information message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
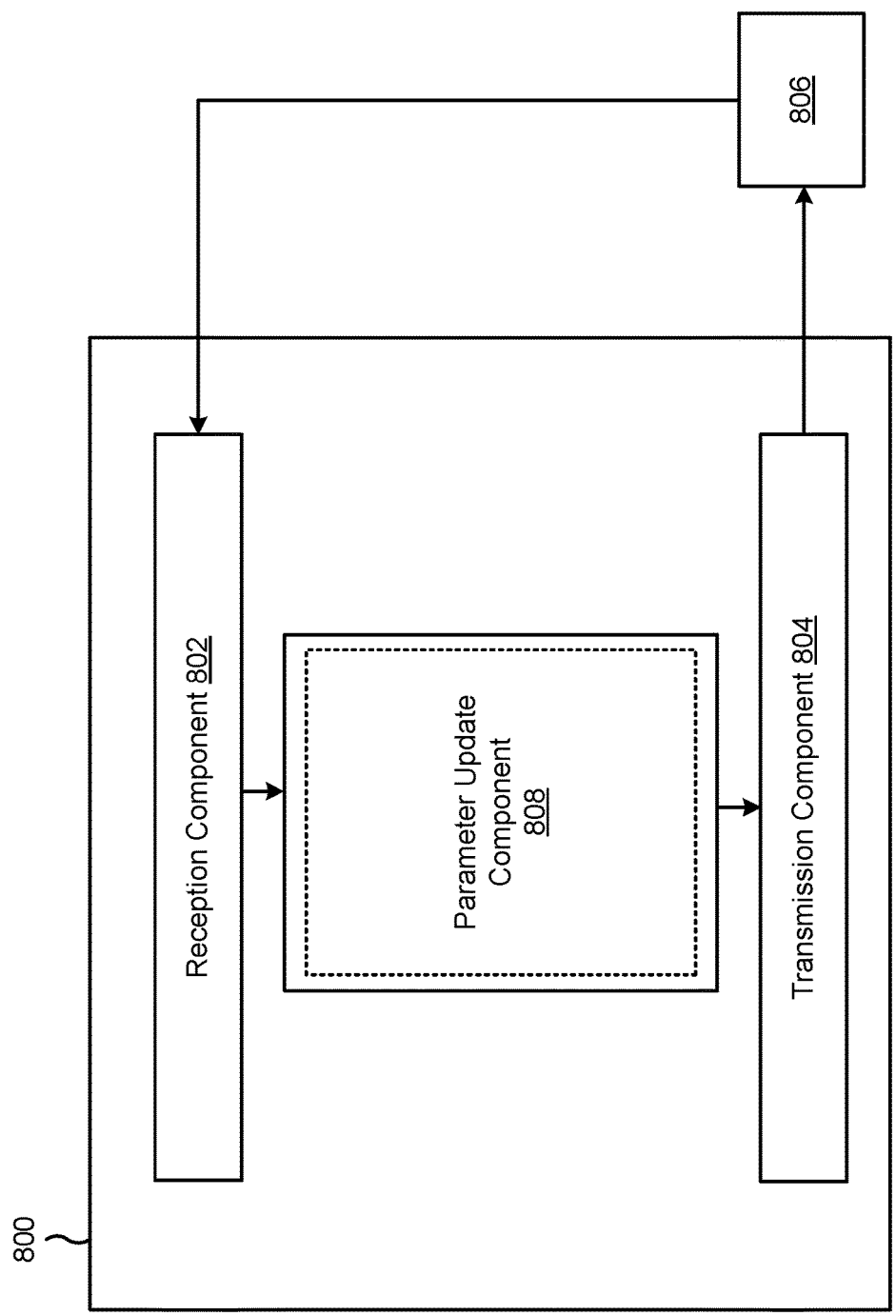
FIGS. 8-9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a parameter update component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, among other examples. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The transmission component 804 may transmit information identifying a panel or beam configuration associated with a set of carriers. The reception component 802 or the transmission component 804 may communicate with a base station in accordance with the panel or beam configuration associated with the set of carriers. The parameter update component 808 may update one or more communication-related parameters, such as a panel-related parameter or a beam-related parameter, among other examples. In some aspects, the parameter update component 808 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
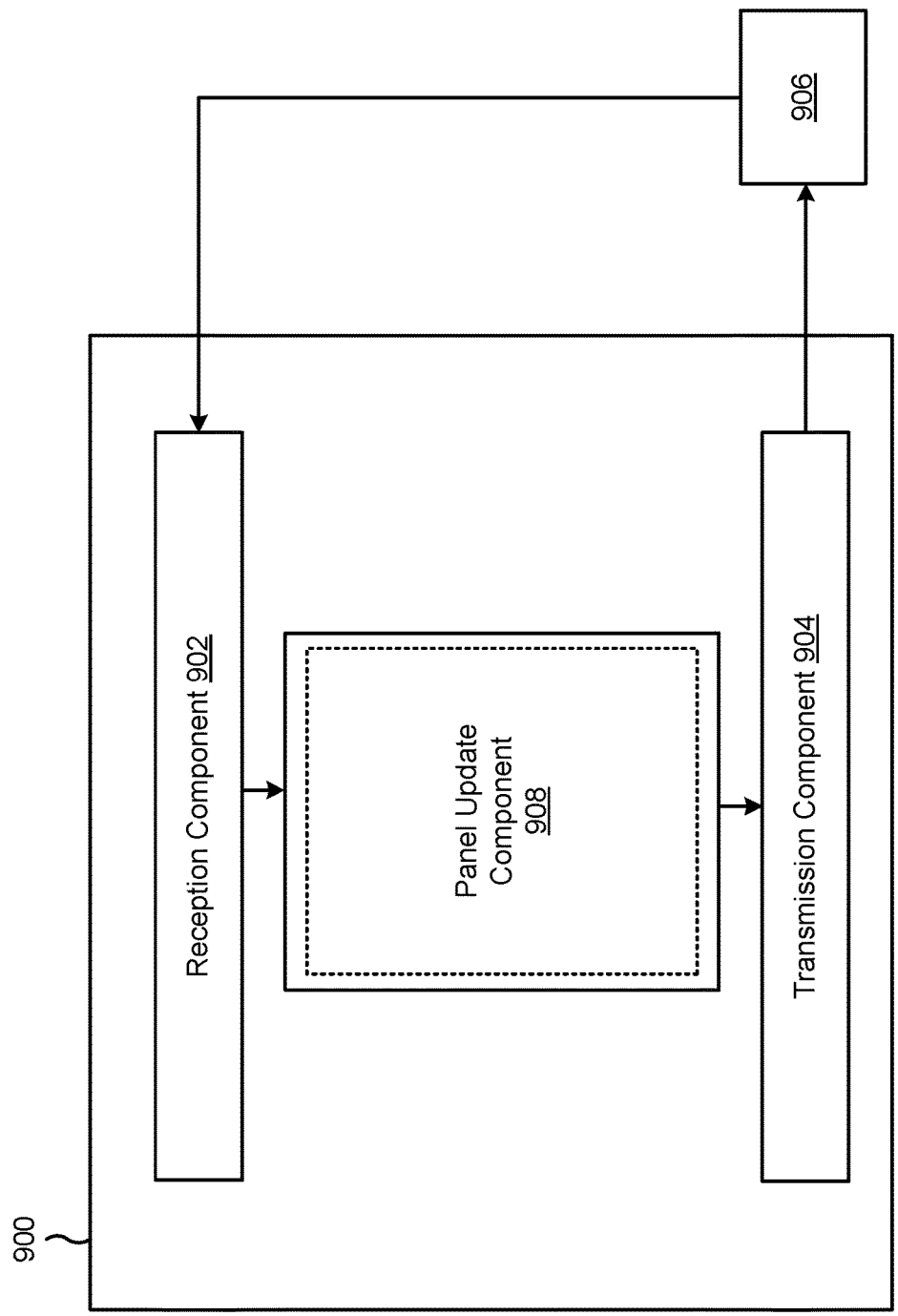

FIG. 9 is a block diagram of an example apparatus 900 for wireless communication. The apparatus 900 may be a BS, or a BS may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a panel update component 908, among other examples.

In some aspects, the apparatus 900 may be configured to perform one or more operations described herein in connection with FIG. 5. Additionally or alternatively, the apparatus 900 may be configured to perform one or more processes described herein, such as process 700 of FIG. 7, among other examples. In some aspects, the apparatus 900 and/or one or more components shown in FIG. 9 may include one or more components of the BS described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the BS described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the BS described above in connection with FIG. 2. In some aspects, the transmission component 904 may be co-located with the reception component 902 in a transceiver.

The reception component 902 may receive information identifying a panel or beam configuration associated with a set of carriers. The reception component 902 or the transmission component 904 may communicate with a UE in accordance with the panel or beam configuration associated with the set of carriers. The parameter update component 908 may cause the apparatus 900 to transmit a message to the apparatus 906 to cause the apparatus 906 to update one or more communication-related parameters, such as a panel-related parameter or a beam-related parameter, among other examples. In some aspects, the parameter update component 908 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting information identifying a panel or beam configuration associated with a set of carriers; and communicating with a base station in accordance with the panel or beam configuration associated with the set of carriers.

Aspect 2: The method of Aspect 1, wherein transmitting the information identifying the panel or beam configuration comprises: transmitting a UE capability message including the information identifying the panel or beam configuration.

Aspect 3: The method of any of Aspects 1 to 2, wherein the panel or beam configuration includes identification information identifying at least one panel or beam, and wherein the identification information includes a panel identifier.

Aspect 4: The method of any of Aspects 1 to 3, wherein the panel or beam configuration includes a panel-related operation parameter, and wherein the panel-related operation parameter includes at least one of: a panel activation status, an uplink timing advance parameter, an uplink power control parameter, or a downlink fast Fourier transform window parameter.

Aspect 5: The method of any of Aspects 1 to 4, wherein the information identifying the panel or beam configuration includes information indicating one or more carriers, of the set of carriers, to which an identified panel-related operation parameter applies.

Aspect 6: The method of any of Aspects 1 to 5, wherein the information identifying the panel or beam configuration includes information indicating one or more panels to which an identified panel-related operation parameter applies.

Aspect 7: The method of any of Aspects 1 to 6, wherein the information identifying the panel or beam configuration includes information indicating one or more panels to which an identified panel-related operation parameter applies across one or more carriers of the set of carriers.

Aspect 8: The method of any of Aspects 1 to 7, wherein the information identifying the panel or beam configuration includes information indicating that a subset of the set of carriers shares a common panel.

Aspect 9: The method of Aspect 8, wherein the subset of the set of carriers is identified by a band, a band combination, or a set of carrier indices.

Aspect 10: The method of any of Aspects 8 to 9, wherein the common panel is identified by a panel identifier or panel configuration.

Aspect 11: The method of Aspect 10, wherein the panel identifier is associated with a single common identifier space and an associated panel is configured for downlink-only processing, uplink-only processing, or downlink and uplink processing.

Aspect 12: The method of Aspect 10, wherein the panel identifier is associated with a first panel identifier space for a downlink-only processing panel and a second panel identifier space for an uplink-only processing panel.

Aspect 13: The method of any of Aspects 1 to 12, wherein the information identifying the panel or beam configuration includes information indicating that a subset of the set of carriers shares a plurality of panels.

Aspect 14: The method of any of Aspects 1 to 13, further comprising: receiving a configuration message updating one or more panel-related operation parameters for a particular panel across a plurality of carriers of the set of carriers.

Aspect 15: The method of Aspect 14, wherein a panel-related operation parameter, of the one or more panel-related operation parameters, has a common value across the plurality of carriers.

Aspect 16: The method of any of Aspects 14 to 15, wherein the particular panel is identified by a base station assigned panel identifier that corresponds to a UE panel identifier of the particular panel.

Aspect 17: The method of any of Aspects 14 to 16, wherein the panel or beam configuration message is at least one of: a downlink control information message, a medium access control control element message, or a radio resource control message.

Aspect 18: The method of any of Aspects 14 to 17, wherein the panel or beam configuration message includes particular information identifying a corresponding applied panel identifier or panel group identifier and identifying the plurality of carriers, and wherein the particular information comprises: information identifying a plurality of serving cells sharing the particular panel, information identifying carrier indices of the plurality of carriers, information identifying a carrier group index of the plurality of carriers, or information identifying a single carrier index.

Aspect 19: The method of any of Aspects 14 to 18, further comprising: updating the one or more panel-related operation parameters across the plurality of carriers identified in the panel or beam configuration message.

Aspect 20: The method of Aspect 1, further comprising: updating, based at least in part on transmitting the information identifying the panel or beam configuration, a plurality of beam-related operation parameters across a plurality of carriers of the set of carriers.

Aspect 21: The method of Aspect 20, wherein updating the plurality of beam-related operation parameters comprises: updating a first beam on a particular panel with a first value of one of plurality of beam-related operation parameters; and updating a second beam on the particular panel with a second value that is different from the first value of one of plurality of beam-related operation parameters.

Aspect 22: The method of any of Aspects 20 to 21, further comprising: receiving a beam indication based at least in part on transmitting the information identifying the panel or beam configuration; and wherein updating the plurality of beam-related operation parameters comprises: updating the plurality of beam-related operation parameters based at least in part on the beam indication, wherein updating the plurality of beam-related operation parameters comprises: updating the plurality of beam-related operation parameters based at least in part on the beam indication.

Aspect 23: The method of Aspect 22, wherein the beam indication is at least one of: a downlink transmission configuration indicator (TCI) state, an uplink TCI state, a joint downlink and uplink TCI state, or a spatial relationship information message.

Aspect 24: A method of wireless communication performed by a base station, comprising: receiving information identifying a panel or beam configuration associated with a set of carriers; and communicating with a user equipment (UE) in accordance with the panel or beam configuration associated with the set of carriers.

Aspect 25: The method of Aspect 24, wherein receiving the information identifying the panel or beam configuration comprises: receiving a UE capability message including the information identifying the panel or beam configuration.

Aspect 26: The method of any of Aspects 24 to 25, wherein the panel or beam configuration includes identification information identifying at least one panel or beam, and wherein the identification information includes a panel identifier.

Aspect 27: The method of any of Aspects 24 to 26, wherein the panel or beam configuration includes a panel-related operation parameter, and wherein the panel-related operation parameter includes at least one of: a panel activation status, an uplink timing advance parameter, an uplink power control parameter, or a downlink fast Fourier transform window parameter.

Aspect 28: The method of any of Aspects 24 to 27, wherein the information identifying the panel or beam configuration includes information indicating one or more carriers, of the set of carriers, to which an identified panel-related operation parameter applies.

Aspect 29: The method of any of Aspects 24 to 28, wherein the information identifying the panel or beam configuration includes information indicating one or more panels to which an identified panel-related operation parameter applies.

Aspect 30: The method of any of Aspects 24 to 29, wherein the information identifying the panel or beam configuration includes information indicating one or more panels to which an identified panel-related operation parameter applies across one or more carriers of the set of carriers.

Aspect 31: The method of any of Aspects 24 to 30, wherein the information identifying the panel or beam configuration includes information indicating that a subset of the set of carriers shares a common panel.

Aspect 32: The method of Aspect 31, wherein the subset of the set of carriers is identified by a band, a band combination, or a set of carrier indices.

Aspect 33: The method of Aspect 31, wherein the common panel is identified by a panel identifier or panel configuration.

Aspect 34: The method of Aspect 33, wherein the panel identifier is associated with a single common identifier space and an associated panel is configured for downlink-only processing, uplink-only processing, or downlink and uplink processing.

Aspect 35: The method of any of Aspects 33 to 34, wherein the panel identifier is associated with a first panel identifier space for a downlink-only processing panel and a second panel identifier space for an uplink-only processing panel.

Aspect 36: The method of any of Aspects 24 to 35, wherein the information identifying the panel or beam configuration includes information indicating that a subset of the set of carriers shares a plurality of panels.

Aspect 37: The method of any of Aspects 24 to 36, further comprising: transmitting a configuration message to update one or more panel-related operation parameters for a particular panel across a plurality of carriers of the set of carriers.

Aspect 38: The method of Aspect 37, wherein a panel-related operation parameter, of the one or more panel-related operation parameters, has a common value across the plurality of carriers.

Aspect 39: The method of any of Aspects 37 to 38, wherein the particular panel is identified by a base station assigned panel identifier that corresponds to a UE panel identifier of the particular panel.

Aspect 40: The method of any of Aspects 37 to 39, wherein the panel or beam configuration message is at least one of: a downlink control information message, a medium access control control element message, or a radio resource control message.

Aspect 41: The method of any of Aspects 37 to 40, wherein the panel or beam configuration message includes particular information identifying a corresponding applied panel identifier or panel group identifier and identifying the plurality of carriers, and wherein the particular information comprises: information identifying a plurality of serving cells sharing the particular panel, information identifying carrier indices of the plurality of carriers, information identifying a carrier group index of the plurality of carriers, or information identifying a single carrier index.

Aspect 42: The method of any of Aspects 37 to 41, wherein transmitting the configuration message comprises: transmitting the configuration message to update the one or more panel-related operation parameters across the plurality of carriers identified in the panel or beam configuration message.

Aspect 43: The method of any of Aspects 37 to 42, wherein transmitting the configuration message comprises: transmitting the configuration message to update a plurality of beam-related operation parameters across a plurality of carriers of the set of carriers.

Aspect 44: The method of Aspect 43, wherein the configuration message includes information identifying a first update to a first beam on a particular panel with a first value of one of plurality of beam-related operation parameters and information identifying a second update to a second beam on the particular panel with a second value that is different from the first value of one of plurality of beam-related operation parameters.

Aspect 45: The method of any of Aspects 43 to 44, further comprising: transmitting a beam indication based at least in part on transmitting the information identifying the panel or beam configuration to update the plurality of beam-related operation parameters.

Aspect 46: The method of Aspect 45, wherein the beam indication is at least one of: a downlink transmission configuration indicator (TCI) state, an uplink TCI state, a joint downlink and uplink TCI state, or a spatial relationship information message.

Aspect 47: An apparatus for wireless communication at a device, comprising a processor; memory coupled with the processor; and instructions stored in the memory and executable by the processor to cause the apparatus to perform the method of one or more of Aspects 1-23.

Aspect 48: A device for wireless communication, comprising a memory and one or more processors coupled to the memory, the one or more processors configured to perform the method of one or more of Aspects 1-23.

Aspect 49: An apparatus for wireless communication, comprising at least one means for performing the method of one or more of Aspects 1-23.

Aspect 50: A non-transitory computer-readable medium storing code for wireless communication, the code comprising instructions executable by a processor to perform the method of one or more of Aspects 1-23.

Aspect 51: A non-transitory computer-readable medium storing a set of instructions for wireless communication, the set of instructions comprising one or more instructions that, when executed by one or more processors of a device, cause the device to perform the method of one or more of Aspects 1-23.

Aspect 52: An apparatus for wireless communication at a device, comprising a processor; memory coupled with the processor; and instructions stored in the memory and executable by the processor to cause the apparatus to perform the method of one or more of Aspects 24-46.

Aspect 53: A device for wireless communication, comprising a memory and one or more processors coupled to the memory, the one or more processors configured to perform the method of one or more of Aspects 24-46.

Aspect 54: An apparatus for wireless communication, comprising at least one means for performing the method of one or more of Aspects 24-46.

Aspect 55: A non-transitory computer-readable medium storing code for wireless communication, the code comprising instructions executable by a processor to perform the method of one or more of Aspects 24-46.

Aspect 56: A non-transitory computer-readable medium storing a set of instructions for wireless communication, the set of instructions comprising one or more instructions that, when executed by one or more processors of a device, cause the device to perform the method of one or more of Aspects 24-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors coupled to the one or more memories, the one or more processors configured to:
transmit information identifying a panel configuration associated with a band that includes a set of carriers, the panel configuration including an antenna port group identifier that applies to the band and a set of panel-related operation parameters, the set of panel-related operation parameters including at least one of an uplink timing advance parameter or a downlink fast Fourier transform window parameter; and
communicate with a network entity in accordance with the panel configuration associated with the band.

2. The UE of claim 1, wherein the one or more processors, to transmit the information identifying the panel configuration, are configured to:
transmit a UE capability message including the information identifying the panel configuration.

3. The UE of claim 1, wherein the panel configuration includes identification information identifying at least one panel, and
wherein the identification information includes a panel identifier.

4. The UE of claim 1, wherein the set of panel-related operation parameters includes a panel activation status or an uplink power control parameter.

5. The UE of claim 1, wherein the information identifying the panel configuration includes information indicating an identified panel-related operation parameter applies to the band.

6. The UE of claim 1, wherein the information identifying the panel configuration includes information indicating one or more panels to which an identified panel-related operation parameter applies.

7. The UE of claim 1, wherein the information identifying the panel configuration includes information indicating one or more panels to which an identified panel-related operation parameter applies across the band.

8. The UE of claim 1, wherein the information identifying the panel configuration includes information indicating that the set of carriers shares a common panel.

9. The UE of claim 8, wherein the common panel is identified by a panel identifier or panel configuration.

10. The UE of claim 9, wherein the panel identifier is associated with a single common identifier space and an associated panel is configured for downlink-only processing, uplink-only processing, or downlink and uplink processing.

11. The UE of claim 9, wherein the panel identifier is associated with a first panel identifier space for a downlink-only processing panel and a second panel identifier space for an uplink-only processing panel.

12. The UE of claim 1, wherein the information identifying the panel configuration includes information indicating that the band shares a plurality of panels.

13. The UE of claim 1, wherein the one or more processors are further configured to:
receive a configuration message updating one or more panel-related operation parameters for a particular panel across the band.

14. The UE of claim 13, wherein a panel-related operation parameter, of the one or more panel-related operation parameters, has a common value across the band.

15. The UE of claim 13, wherein the particular panel is identified by a network entity assigned panel identifier that corresponds to a UE panel identifier of the particular panel.

16. The UE of claim 13, wherein the configuration message is at least one of:
a downlink control information message,
a medium access control control element message, or
a radio resource control message.

17. The UE of claim 13, wherein the configuration message includes particular information identifying a corresponding applied panel identifier or panel group identifier and identifying the band, and
wherein the particular information comprises:
information identifying a plurality of serving cells sharing the particular panel,
information identifying carrier indices of the band,
information identifying a carrier group index of the band, or
information identifying a single carrier index.

18. The UE of claim 13, wherein the one or more processors are further configured to:
update the one or more panel-related operation parameters across the band identified in the configuration message.

19. The UE of claim 1, wherein the one or more processors are further configured to:

update, based at least in part on transmission of the information identifying the panel configuration, a plurality of beam-related operation parameters across the band.

20. The UE of claim 19, wherein the one or more processors, to update the plurality of beam-related operation parameters, are configured to:
update a first beam on a particular panel with a first value of one of the plurality of beam-related operation parameters; and
update a second beam on the particular panel with a second value that is different from the first value of one of the plurality of beam-related operation parameters.

21. The UE of claim 19, wherein the one or more processors are further configured to:
receive a beam indication based at least in part on transmission of the information identifying the panel configuration; and
wherein the one or more processors, to update the plurality of beam-related operation parameters, are configured to:
update the plurality of beam-related operation parameters based at least in part on the beam indication.

22. The UE of claim 21, wherein the beam indication is at least one of:
a downlink transmission configuration indicator (TCI) state,
an uplink TCI state,
a joint downlink and uplink TCI state, or
a spatial relationship information message.

23. A network entity for wireless communication, comprising:
one or more memories; and
one or more processors coupled to the one or more memories, the one or more processors configured to:
receive information identifying a panel configuration associated with a band that includes a set of carriers, the panel configuration including an antenna port group identifier that applies to the band and a set of panel-related operation parameters, the set of panel-related operation parameters including at least one of an uplink timing advance parameter or a downlink fast Fourier transform window parameter; and
communicate with a user equipment (UE) in accordance with the panel configuration associated with the band.

24. The network entity of claim 23, wherein the one or more processors, to receive the information identifying the panel configuration, are configured to:
receive a UE capability message including the information identifying the panel configuration.

25. The network entity of claim 23, wherein the panel configuration includes identification information identifying at least one panel, and
wherein the identification information includes a panel identifier.

26. The network entity of claim 23, wherein the set of panel-related operation parameters includes a panel activation status or an uplink control parameter.

27. The network entity of claim 23, wherein the information identifying the panel configuration includes information indicating an identified panel-related operation parameter applies to the band.

28. The network entity of claim 23, wherein the information identifying the panel configuration includes information indicating one or more panels to which an identified panel-related operation parameter applies.

29. A method of wireless communication performed by a user equipment (UE), comprising:
transmitting information identifying a panel configuration associated with a band that includes a set of carriers, the panel configuration including an antenna port group identifier that applies to the band and a set of panel-related operation parameters, the set of panel-related operation parameters including at least one of an uplink timing advance parameter or a downlink fast Fourier transform window parameter; and
communicating with a network entity in accordance with the panel configuration associated with the band.

30. A method of wireless communication performed by a network entity, comprising:
receiving information identifying a panel configuration associated with a band that includes a set of carriers, the panel configuration including an antenna port group identifier that applies to the band and a set of panel-related operation parameters, the set of panel-related operation parameters including at least one of an uplink timing advance parameter or a downlink fast Fourier transform window parameter; and
communicating with a user equipment (UE) in accordance with the panel configuration associated with the band.

\* \* \* \* \*